US012779713B2

(12) United States Patent
Li

(10) Patent No.: US 12,779,713 B2
(45) Date of Patent: Nov. 3, 2026

(54) HANDLE TYPE ADHESIVE TAPE CUTTER

(71) Applicant: Jian Li, Ningbo (CN)

(72) Inventor: Jian Li, Ningbo (CN)

( * ) Notice: Subject to any disclaimer, the term of this patent is extended or adjusted under 35 U.S.C. 154(b) by 567 days.

(21) Appl. No.: 18/330,355

(22) Filed: Jun. 6, 2023

(65) Prior Publication Data

US 2024/0408777 A1 Dec. 12, 2024

(51) Int. Cl.
*B26B 11/00* (2006.01)
*B65H 35/00* (2006.01)

(52) U.S. Cl.
CPC .......... *B26B 11/00* (2013.01); *B65H 35/0033* (2013.01); *B65H 2701/377* (2013.01)

(58) Field of Classification Search
CPC .......... B65H 35/0026; B65H 2701/377; B65H 35/06; B65H 35/004; B65H 35/0033; B65B 27/00; B26B 11/00
USPC ............ 30/2, 158, 162; D19/69; 7/158, 160; 225/7, 23, 25, 33, 46, 56, 91; 156/523, 156/527, 530
See application file for complete search history.

(56) References Cited

U.S. PATENT DOCUMENTS 3,002,273 A * 10/1961 Merritt .................. B26B 27/005 30/2
3,448,518 A * 6/1969 Sklar ....................... B26B 5/002 30/162
5,110,401 A * 5/1992 Huang ............... B65H 35/0033 156/577
6,478,067 B1 * 11/2002 Huang ............... B65H 35/0033 156/577
6,799,623 B1 * 10/2004 Cheng ................ B65H 35/0033 225/56
7,121,312 B2 10/2006 Yu
7,185,435 B1 * 3/2007 Tseng ...................... B26B 5/001 30/162
7,334,620 B2 2/2008 Imazeki
7,357,285 B2 4/2008 Namekawa
7,506,835 B2 * 3/2009 Huang ............... B65H 35/0073 156/577
7,591,037 B1 * 9/2009 Strickland ............... B26B 11/00 7/156
2003/0009887 A1 * 1/2003 Cybulski ................. B26B 5/002 30/162
2009/0301660 A1 12/2009 Liu
2011/0035947 A1 * 2/2011 Rohrbach ............... B26B 5/003 30/162
2012/0324739 A1 12/2012 Wambaugh

* cited by examiner

*Primary Examiner* — Boyer D Ashley

(57) ABSTRACT

Disclosed is a handle type adhesive tape cutter. A handheld mechanism, a distribution mechanism and a control mechanism are combined together through a fixed base plate, so that the adhesive tape cutter has the functions of packaging and cutting adhesive tapes. Meanwhile, a box opener is arranged on the fixed base plate or a side plate of the control mechanism. A box opening blade in the box opener is capable of stretching out or retracting relative to the side plate or the fixed base plate. At ordinary times, the box opening blade is in a retracted state relative to the side plate or the fixed base plate, so as to achieve rapid opening of a box, thereby reducing the box opening difficulty.

5 Claims, 2 Drawing Sheets

HANDLE TYPE ADHESIVE TAPE CUTTER

FIELD OF THE INVENTION

The present invention relates to the technical field of adhesive tape cutters, and particularly relates to a handle type adhesive tape cutter.

BACKGROUND

An adhesive tape cutter, just as its name implies, is a cutting instrument for an adhesive tape. People can conveniently tear the adhesive tape down by the adhesive tape cutter during use of the adhesive tape and are no longer troubled due to the reason that the adhesive tape is difficult to pull apart.

Boxes are mostly sealed with the adhesive tapes in logistics packaging. Therefore, the adhesive tape cutter becomes a necessity in the logistics packaging industry. For the convenience of use, a handheld adhesive tape is usually used. It is provided with a handheld mechanism, a distribution mechanism and a control mechanism. When a user uses the adhesive tape cutter, he/she can hold the handheld mechanism to fix an adhesive tape roll by the distribution mechanism and transfer and cut the adhesive tape by the control mechanism, so as to achieve the purpose of packaging and adhesive tape cutting. However, in actual use, there is still a problem of opening the box after the box is packaged. As the adhesive tape is adhered compactly during packaging, it is difficult to open the box. The existing adhesive tape cutters all do not have the function of cutting box-opening adhesive tapes, resulting in difficulty to open the box.

Therefore, whether the adhesive tape cutter is further improved to solve the above problem becomes the problem to be settled urgently.

SUMMARY

In view of this, the present invention provides a handle type adhesive tape cutter to solve the problem of difficulty to open the box as the adhesive tape cutters do not have the function of cutting box-opening adhesive tapes in the prior art.

The technical solution provided by the present invention is specifically as follows: a handle type adhesive tape cutter, including a fixed base plate, a handheld mechanism, a distribution mechanism, a control mechanism and a box opener, wherein the handheld mechanism is fixedly connected to the fixed base plate;

the distribution mechanism and the control mechanism both are located above the handheld mechanism and are connected to the fixed base plate, and the distribution mechanism is capable of rotating relative to the fixed base plate under action of an external force;

the control mechanism includes a side plate, a roller and a cutting blade;

the side plate is parallelly arranged relative to the fixed base plate;

the roller is rotatably mounted between the fixed base plate and the side plate;

the cutting blade is located above the roller, and both ends of the cutting blade are fixedly connected to the fixed base plate and the side plate, respectively; and the box opener is mounted on the side plate or the fixed base plate, and a box opening blade in the box opener is capable of stretching out or retracting relative to the side plate or the fixed base plate.

Preferably, the box opener is an art knife, comprising a shell, the box opening blade and a locating lock;

the shell is fixedly mounted on the side plate or the fixed base plate, forms an accommodation space with the side plate or the fixed base plate, and is provided with a slideway communicated with the accommodation space;

the box opening blade is located in the accommodation space and is provided with a free end and a connecting end; and the locating lock is mounted in the slideway, is connected to the connecting end of the box opening blade, and is pushed by an external force to slide along the slideway, so as to drive the box opening blade to slide in the accommodation space; and the free end of the box opening blade stretches out or retracts relative to the side plate or the fixed base plate.

Further preferably, the box opener includes a shell, a box opening blade and a rotary knob;

the shell is fixedly mounted on the side plate or the fixed base plate and forms an accommodation space with the side plate or the fixed base plate, a side wall of the accommodation space is provided with a slot, and the shell is provided with a mounting groove communicated with the accommodation space;

the box opening blade is located in the accommodation space and is provided with a free end and a connecting end; and the rotary knob is rotatably mounted in the mounting groove in the shell and is connected to the connecting end of the box opening blade; and when the rotary knob is rotated, the box opening blade is driven to rotate along the slot in the accommodation space, and in the rotating process of the box opening blade, the free end of the box opening blade stretches out or retracts relative to the side plate or the fixed base plate.

Further, the control mechanism further includes a smoothing plate; and the smoothing plate is located above the roller, a lower end of the smoothing plate is mounted between the fixed base plate and the side plate, and an upper end of the smoothing plate extends obliquely upwards.

Further preferably, the handle type adhesive tape cutter further includes a guide plate, wherein one end of the guide plate is hinged with the handheld mechanism, and the other end thereof extends to a side of the roller to be adjacent to the roller.

Further preferably, the distribution mechanism includes a rotating wheel, a positioning shaft and a limiting nut;

a center of the rotating wheel is provided with a mounting hole penetrating through both sides;

one end of the positioning shaft passes through the mounting hole in the rotating wheel and is fixedly connected to the fixed base plate, and the rotating wheel is capable of rotating relative to the positioning shaft; and the limiting nut is mounted at the other end of the positioning shaft in a threaded manner to limit the rotating wheel.

According to the adhesive tape cutter provided by the present invention, the handheld mechanism, the distribution mechanism and the control mechanism are combined together through the fixed base plate, so that the adhesive tape cutter has the functions of packaging and cutting adhesive tapes. Meanwhile, the box opener is arranged on the fixed base plate or the side plate of the control mechanism. The box opening blade in the box opener is capable of stretching out or retracting relative to the side plate or the fixed base plate. At ordinary times, the box opening blade is in a retracted state relative to the side plate or the fixed base plate, so as to prevent people from being hurt accidentally, and thus, the safety is improved. When it is necessary to open the box, the box opening blade stretches out relative to the side plate or the fixed base plate to incise the packaging adhesive tape along a packaging opening, so as to achieve rapid opening of a box, thereby reducing the box opening difficulty.

The handle type adhesive tape cutter provided by the present invention features simple structure, reasonable design, convenience in use and so forth.

It should be understood that the above general description and the following detailed description are only illustrative and explanatory, and cannot limit the present invention.

BRIEF DESCRIPTION OF THE DRAWINGS

The drawings of the description constituting a part of the application are to provide further understanding of the present invention. The schematic embodiment and description thereof are used for explaining the present invention and do not limit the present invention improperly.

In order to describe the embodiments of the present invention or the technical solution in the prior art more clearly, brief introduction on drawings needed to be used in the embodiment will be made below. It is apparent that those of ordinary skill in the art further can obtain other drawings according to the drawings without making creative efforts.

DETAILED DESCRIPTION OF THE EMBODIMENTS

Figure 1:
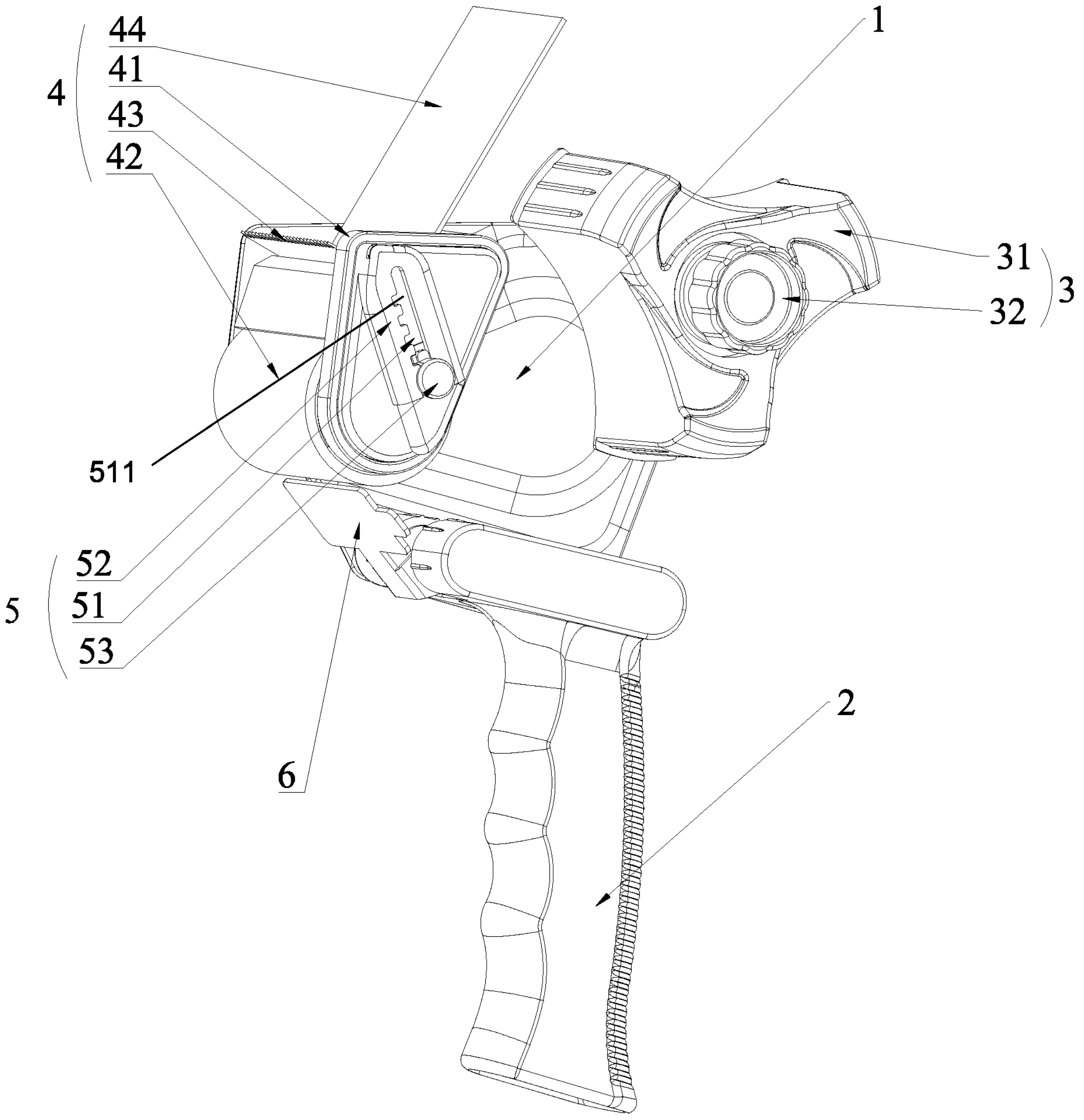
FIG. 1 is a structural schematic diagram of an adhesive tape cutter provided by the embodiments of the present invention.

The present invention will be described in detail below with reference to the drawings and the embodiments. Each example is provided by the present invention in an explained manner rather than limiting the present invention. Actually, those skilled in the art clearly understand that modifications and variations on the present invention can be made without departing the scope or the spirit of the present invention. For example, features of a part depicted or described as one embodiment can be used for another embodiment to generate yet another embodiment. Thus, it is expected that the present invention comprises modifications and variations classified into the scope of the attached claims and equivalents thereof.

In description of the present invention, orientation or position relationships indicated by terms: 'longitudinal', 'transverse', 'upper', 'lower', 'front', 'back', 'left', 'right', 'vertical', 'horizontal', 'top', 'bottom' and the like are orientation or position relationships indicated by the drawings and are only to describe the present invention and simplify the description rather than indicating or implying that the indicated device or components must have specific orientations. Therefore, it cannot be construed as limitations to the present invention. The terms 'connecting', 'connection' and 'arrange' used in the present invention should be understood in a broad sense, for example, 'connecting', 'connection' and 'arrange' can be either fixed connection or detachable connection; can be either directly connection or connection via intermediate parts; and can be either wired electric connection and wireless electric connection or wireless communication signal connection. Those skilled in the art can understand specific meanings of the terms according to specific conditions.

The attached drawings depict one or more examples of the present invention. Detailed description utilizes number and letter marks to substitute features in the drawings. Similar or analogous marks in the drawings and description have been used for substituting similar or analogous parts of the present invention. As used herein, the terms 'first', 'second', 'third' and the like can be used interconvertibly to separate one component from the other one and do not aim to represent position or importance of a single component.

Figure 2:
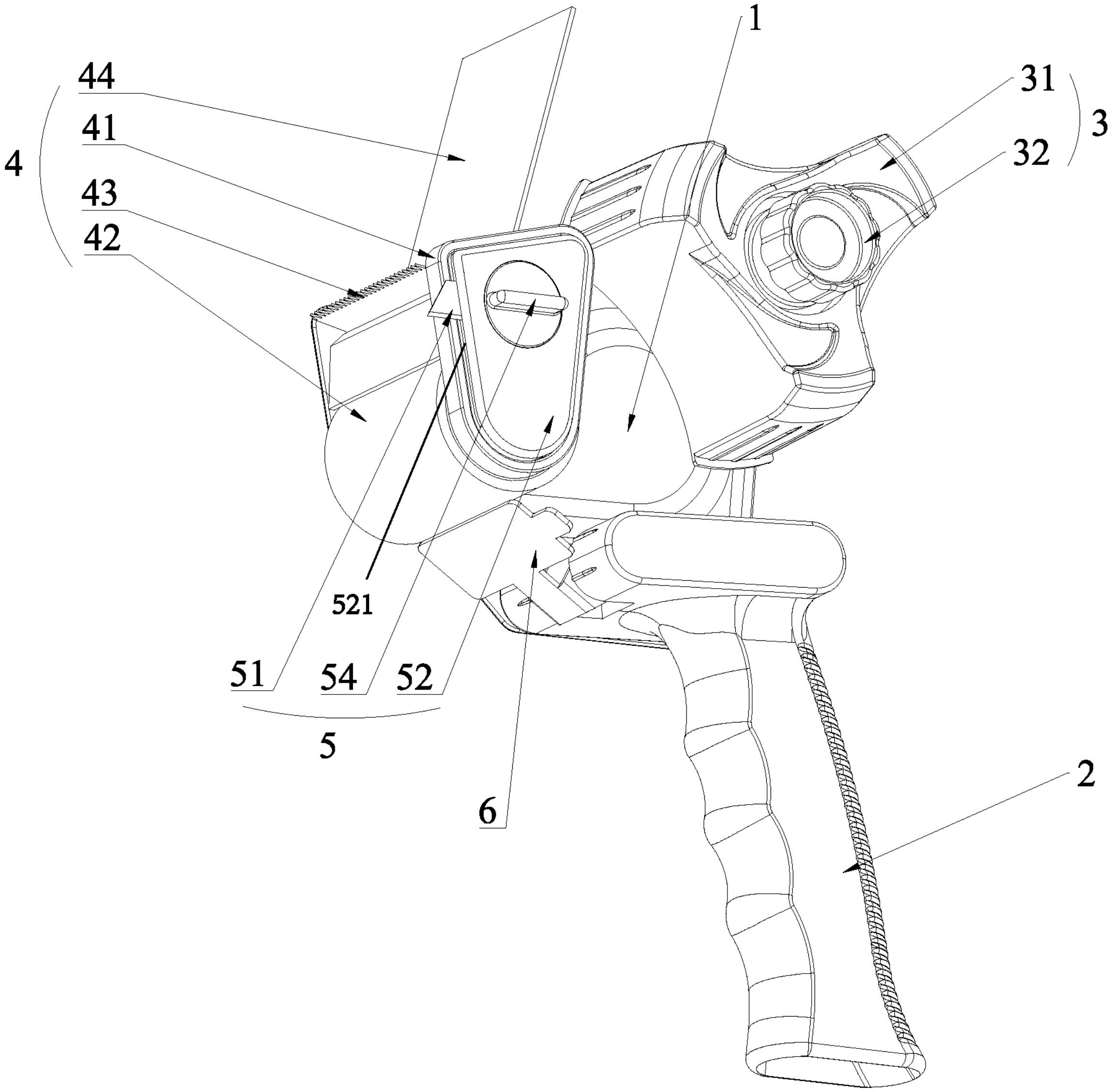
FIG. 2 is a structural schematic diagram of another adhesive tape cutter provided by the embodiments of the present invention.

To solve the problem of difficulty to open the box as the adhesive tape cutters do not have the function of cutting box-opening adhesive tapes in the prior art, the embodiment provides a novel handle type adhesive tape cutter. As shown in FIG. 1 and FIG. 2, the handle type adhesive tape cutter mainly includes a fixed base plate 1, a handheld mechanism 2, a distribution mechanism 3, a control mechanism 4 and a box opener 5, wherein the handheld mechanism 2 is fixedly connected to the fixed base plate 1. For the convenience of holding the handle type adhesive tape cutter, as shown in FIG. 1 and FIG. 2, one side of the handheld mechanism 2 is designed with a plurality of sunken curved surfaces adaptive to the hand shape. The distribution mechanism 3 and the control mechanism 4 are arranged at an interval, both are located above the handheld mechanism 2, and are connected to the fixed base plate 1. The distribution mechanism 3 can rotate relative to the fixed base plate 1 under action of an external force. The control mechanism 4 mainly includes a side plate 41, a roller 42 and a cutting blade 43, wherein the side plate 41 is parallelly arranged relative to the fixed base plate 1; the roller 42 is rotatably mounted between the fixed base plate 1 and the side plate 41; the cutting blade 43 is located above the roller 42; both ends of the cutting blade 43 are fixedly connected to the fixed base plate 1 and the side plate 41, respectively; the box opener 5 can not only be mounted on the side plate 41, but also be mounted on the fixed base plate 1. In the FIG. 1 and FIG. 2, by taking a condition that the box opener is mounted on the side plate 41 as an example, the box opening blade 51 is arranged in the box opener 5 to cut the packaging adhesive tape to open the box. When the box opener 5 is mounted on the side plate 41, the box opening blade 51 can stretch out or retracts relative to the side plate 41. When the box opener 5 is mounted on the fixed base plate 1, the box opening blade 51 can stretch out or retracts relative to the fixed base plate 1 and the side plate 41.

The specific working principle of the handle type adhesive tape cutter is as follows: when the cutter is used for packaging, the adhesive tape roll is sleeved on the distribution mechanism, then the end of the adhesive tape bypasses the roller in the control mechanism and is adhered to a pre-packaged box body, and then the handheld mechanism is held to move along the packaging box body. As the end of the adhesive tape has been fixedly adhered to the pre-packaged box body, the handheld mechanism moves to drive the distribution mechanism to rotate relative to the fixed base plate to drive the adhesive tape roller sleeved on the distribution mechanism to rotate so as to release the adhesive tape till it is adhered completely. The tail end of the handheld mechanism is lifted upwards, so that the cutting blade in the control mechanism is connected to the adhesive tape to cut the adhesive tape conveniently and rapidly. When it is necessary to perform the box opening operation, the box opening blade in the box opener stretches out, and the handheld mechanism is held to connect the box opening blade to the adhesive tape. The box opening blade moves along the box opening of the packaging box to incise the adhesive tape on the boxing opening, so as to achieve rapid opening of a box. When the box opener is not used, the box opening blade retracts, so that the handle type adhesive tape cutter is safely used.

The structure of the box opener can be specifically designed according to an actual demand. The embodiment provides two specific box opener structures. However, in an actual using process, the structure of the box opener is not limited to the two structures provided below.

As shown in FIG. 1, the box opener 5 in the adhesive tape cutter is the art knife and specifically includes the shell 52, the box opening blade 51 and the locating lock 53. The shell 52 is fixedly mounted on the side plate 41; an accommodation space is formed between the shell 52 and the side plate 41; the shell 52 is provided with the slideway 511 communicated with the accommodation space; the box opening blade 51 is located in the accommodation space formed between the shell 52 and the side plate 41; the box opening blade 51 is provided with the free end and the connecting end; the locating lock 53 is mounted in the slideway 511, is connected to the connecting end of the box opening blade 51, and pushed by an external force, slides along the slideway 511 to drive the box opening blade 51 to slide in the accommodation space, so that the free end of the box opening blade 51 stretches out or retracts relative to the side plate 41.

As shown in FIG. 2, the box opener 5 in the adhesive tape cutter mainly includes the shell 52, the box opening blade 51 and the rotary knob 54. The shell 52 is fixedly mounted on the side plate 41; the accommodation space is formed between the shell 52 and the side plate 41, and the side wall of the accommodation space is provided with a slot 521; the shell 52 is provided with the mounting groove communicated with the accommodation space; the box opening blade 51 is located in the accommodation space formed between the shell 52 and the side plate 41; the box opening blade 51 is provided with the free end and the connecting end; the rotary knob 54 is rotatably mounted in the mounting groove in the shell 52, is connected to the connecting end of the box opening blade 51, and drives the box opening blade 51 to rotate along the slot 521 in the accommodation space when being rotated. Moreover, in the rotating process of the box opening blade 51, the free end of the box opening blade 51 stretches out or retracts relative to the side plate 41.

The adhesive tape cutters in FIG. 1 and FIG. 2 both are described by taking a condition that the box opener 5 is mounted on the side plate 41 as an example. The box opener 5 can further be arranged on the fixed base plate 1. Thanks to invariable structure of the box opener 5, the box opener is no longer described repeatedly herein.

To facilitate air discharge between the packaging adhesive tape and the box body, as an improvement of the technical solution, as shown in FIG. 1 and FIG. 2, the control mechanism 4 is further provided with the smoothing plate 44. The smoothing plate 44 is located above the roller 42, the lower end of the smoothing plate 44 is mounted between the fixed base plate 1 and the side plate 41, and the upper end of the smoothing plate 44 extends obliquely upwards, and specifically, the upper end of the smoothing plate extends towards the direction of the distribution mechanism 3.

When the smoothing plate is arranged, the adhesive tape adhered to the box body can be struck off on the box body through the smoothing plate, so as to discharge air between the adhesive tape and the box body, thereby improving the degree of fastness of the adhesive tape adhered to the box body.

To ensure that the adhesive tape is capable of moving along the roller in the controller all the time so as to prevent deviation of the adhesive tape, as an improvement of the technical solution, as shown in FIG. 1 and FIG. 2, the handle type adhesive tape cutter is further provided with the guide plate 6. One end of the guide plate 6 is hinged with the handheld mechanism 2, and the other end thereof extends to the side of the roller 42 to be adjacent to the roller 42. Preferably, a torsional spring is arranged between the guide plate 6 and the handheld mechanism 2, so that the end of the guide plate 6 adjacent to the roller 42 is close to the side of the roller 42 all the time.

As shown in FIG. 1 and FIG. 2, the distribution mechanism 3 in the adhesive tape cutter mainly includes the rotating wheel 31, the positioning shaft and the limiting nut 32. The center of the rotating wheel 31 is provided with the mounting hole penetrating through both sides; one end of the positioning shaft passes through the mounting hole in the rotating wheel 31 and is fixedly connected to the fixed base plate 1, and the rotating wheel 31 is capable of rotating relative to the positioning shaft; and the limiting nut 32 is mounted at the other end of the positioning shaft in a threaded manner to limit the rotating wheel 31.

The distribution mechanism mainly fixes the adhesive tape roll through the rotating wheel, and the rotating wheel rotates relative to the positioning shaft, so as to drive the adhesive tape roll to rotate. To increase the frictional force between the rotating wheel and the adhesive tape roller, so as to prevent the adhesive tape roll from rotating relative to the rotating wheel, as an improvement of the technical solution, the side wall of the rotating wheel contacting the adhesive tape roll is provided with anti-skid stripes.

Other embodiments of the present invention will be apparent to those skilled in the art from consideration of the specification and practice of the present invention. This application is intended to cover any variations, uses, or adaptations of the present invention following the general principles thereof and including such departures from the present invention as come within known or customary practice in the art. It is intended that the specification and embodiments be considered as exemplary only, with a true scope and spirit of the present invention being indicated by the following claims.

It will be appreciated that the present invention is not limited to the exact construction that has been described above and illustrated in the drawings, and that various modifications and changes may be made without departing from the scope thereof. It is intended that the scope of the present invention only be limited by the appended claims.

What is claimed is:

1. A handle type adhesive tape cutter, comprising a fixed base plate, a handheld mechanism, a distribution mechanism, a control mechanism and a box opener, wherein the handheld mechanism is fixedly connected to the fixed base plate;

the distribution mechanism and the control mechanism both are located above the handheld mechanism and are connected to the fixed base plate, and the distribution mechanism is capable of rotating relative to the fixed base plate under action of an external force;

the control mechanism comprises a side plate, a roller and a cutting blade;

the side plate is arranged parallel to the fixed base plate, the side plate protrudes outward with respect to a surface of the fixed base plate;

the roller is rotatably mounted between the fixed base plate and the side plate;

the cutting blade is located above the roller, and both ends of the cutting blade are fixedly connected to the fixed base plate and the side plate, respectively; and the box opener is mounted on the side plate, and a box opening blade in the box opener is capable of stretching out or retracting relative to the side plate;

wherein the box opener comprises a shell, a box opening blade and a rotary knob;

the shell is fixedly mounted on the side plate and forms an accommodation space with the side plate, a side wall of the accommodation space is provided with a slot;

the box opening blade is located in the accommodation space and is provided with a free end and a connecting end; and the rotary knob is rotatably mounted in a mounting groove in the shell and is connected to the connecting end of the box opening blade; the rotary knob defines a rotary axis and when the rotary knob is rotated about the rotary axis, the box opening blade is driven to rotate along the slot in the accommodation space, and in a rotating process of the box opening blade, the free end of the box opening blade stretches out or retracts relative to the side plate.

2. The handle type adhesive tape cutter according to claim 1, wherein the control mechanism further comprises a smoothing plate; and the smoothing plate is located above the roller, a lower end of the smoothing plate is mounted between the fixed base plate and the side plate, and an upper end of the smoothing plate extends obliquely upwards.

3. The handle type adhesive tape cutter according to claim 1, wherein the distribution mechanism comprises a rotating wheel, a positioning shaft and a limiting nut;

a center of the rotating wheel is provided with a mounting hole penetrating through both sides;

one end of the positioning shaft passes through the mounting hole in the rotating wheel and is fixedly connected to the fixed base plate, and the rotating wheel is capable of rotating relative to the positioning shaft; and the limiting nut is mounted at an other end of the positioning shaft in a threaded manner to limit the rotating wheel.

4. The handle type adhesive tape cutter according to claim 1, further comprising a guide plate, wherein one end of the guide plate is hinged with the handheld mechanism, and an other end thereof extends to a side of the roller to be adjacent to the roller.

5. The handle type adhesive tape cutter according to claim 4, wherein the handheld mechanism defines a slot, the one end of the guide plate is inserted into the slot and hinged with the handheld mechanism.

* * * * *